United States Patent [19]

Micucci et al.

[11] 4,209,277
[45] Jun. 24, 1980

[54] METHOD AND APPARATUS FOR SEPARATING ELONGATE ELEMENTS

[75] Inventors: Joseph Micucci, Binbrook; Rudolf F. Kuras, Dundas, both of Canada

[73] Assignee: Slater Steel Industries Limited, Hamilton, Canada

[21] Appl. No.: 872,952

[22] Filed: Jan. 27, 1978

[30] Foreign Application Priority Data

Jan. 31, 1977 [GB] United Kingdom ............... 03909/77

[51] Int. Cl.² .......................................... B65G 37/00
[52] U.S. Cl. .................................. 414/330; 198/474
[58] Field of Search .......................... 198/456–457, 198/413, 474, 774–776, 365, 597, 598, 599, 485, 487, 461, 530, 488, 443, 633; 214/8.5 R, 8.5 SS, 8.5 F; 414/330, 112, 119, 131

[56] References Cited

U.S. PATENT DOCUMENTS

| 1,931,405 | 10/1933 | Dahlstrom | 198/416 |
| 3,749,385 | 7/1973 | Ogawa et al. | 214/8.5 F |
| 4,023,667 | 5/1977 | Appel | 198/474 |

Primary Examiner—Robert B. Reeves
Assistant Examiner—Douglas D. Watts
Attorney, Agent, or Firm—Dennison, Dennison, Meserole & Pollack

[57] ABSTRACT

Apparatus and a method for separating elongate elements one at a time from a batch of elements. The apparatus comprises a batch receiver means having an inclined support face to support the leading element of the batch, and element ejector means including at least one finger engageable with the trailing element of said batch to lift said trailing element in an upwardly forward direction to separate said element from said batch.

15 Claims, 3 Drawing Figures

METHOD AND APPARATUS FOR SEPARATING ELONGATE ELEMENTS

The present invention relates to an unpacking device which is particularly suited to unpacking elongate elements, especially flat bars, one at a time, from a batch, and to a method of unpackaging elongate elements one at a time from a batch.

Elongate elements, such as steel wire and flat steel bars, known as "spring flats", are an important product of the modern steel industry. In particular, flat steel bars are employed widely in the automobile industry as suspension springs, and are generally fabricated from high carbon, high chromium alloy steel (AISI 5160). Because of the high hardenability of this particular grade of steel, flat bars fabricated therefrom which are allowed to cool individually on the hot-bed of the steel rolling mill are too brittle and hard for use in the manufacture of suspension springs. It is the usual practice, therefore, to form batches consisting of several formed flat bars (usually three to six flat bars in each batch) to reduce the rate of cooling of the individual bars. The batch is formed by packing the bars, while still red-hot, on top of one another as they come off the last finishing stand of the rolling mill. In this way, the bars may cool slowly in the batch and so are not as brittle as when they cool individually. The resulting strength and flexibility make them particularly suited to the manufacture of suspension springs.

The technique usually employed to cool the batches of flat bars is to pass the batches across a cooling bed of the bar mill in a manner similar to that employed for cooling individual bars. At the end of the cooling bed, the batches are unpacked before the individual bars are further processed, for example by shearing to the desired length.

The unpacking mechanisms which are presently available are cumbersome, unreliable, and, in general, very expensive. In the known unpacking mechanisms, the batch to be unpacked is received by a suitably inclined support at the end of the cooling bed, and the individual bars are separated from the batch, one at a time, by removal of the leading bar from the bottom of the batch. This removal is achieved by suitably positioned fingers below the level of the supported batch which operate to engage with the leading bottom bar to push the bar in an upwards and forwards direction to separate the bar from the batch and to advance the bar to a location forwards of the support, generally onto "shuffle" bars. However, this method of unpacking bars from a batch has several disadvantages. The major disadvantage is that the known mechanisms do not always unpack the batch one bar at a time. This malfunction arises when some of the fingers engage with one bar while other fingers engage with two or even more bars, or possibly do not engage at all. This results in two or more bars being moved from certain locations along the length of the batch while only one bar is moved at other locations. This malfunction results in the batch being disarranged at certain points along its length with the result that the unpacking process has to be halted in order to re-arrange the batch. This particular problem arises especially with batches consisting of relatively thin (for example about 3/16 of an inch) bars. In this case, the batch tends to sag at certain points along its length which causes the bottom, leading bar and the adjacent bar, at least, to be deformed. This, again, results in some of the fingers of the unpacking device engaging with more than one bar. It has also been noted that this problem of unpacking of more than one bar from the batch occurs if the batch has been packed unsymmetrically. In this case, the fingers at one end of the unpacking device engage with the leading, bottom bar while the fingers at the other end of the device either do not engage with a bar or engage with the bar adjacent to the leading bottom bar. This, again, causes uneven unpacking of the batch which results in undesirable interruptions in the unpacking operation.

Further the bars do not always adopt the correct attitude in the notch after the removal of the lowermost bar. Consequently the fingers may not always engage the bar in the desired manner.

There is, therefore, a need in the manufacture of elongate elements, particularly flat metal bars, for improved means of unpacking the bars from batches which have been cooled by progression across the cooling bed of a mill, which does not display the inherent disadvantages outlined above which are associated with the presently known unpacking mechanisms.

According to one aspect of the present invention there is provided apparatus for separating elongate elements one at a time from a batch of the elements comprising a batch receiver means having an inclined support face to support the leading element of the batch, so that abutting faces of said elements are parallel to said support face, and element ejector means including at least one finger engageable with the trailing element of the batch furtherst from said support face to lift the trailing element in an upwardly forward direction to separate the element from the batch.

According to a further aspect of the present invention, there is provided a method of separating elements one at a time from a batch of the elements comprising the steps of depositing the batch in a batch receiver means, supporting the leading element against an inclined support face and lifting the trailing element in an upwardly forward direction to separate the trailing element from the batch.

A preferred embodiment of the present invention will now be described by way of example only with reference to the accompanying drawings in which.

Figure 1:
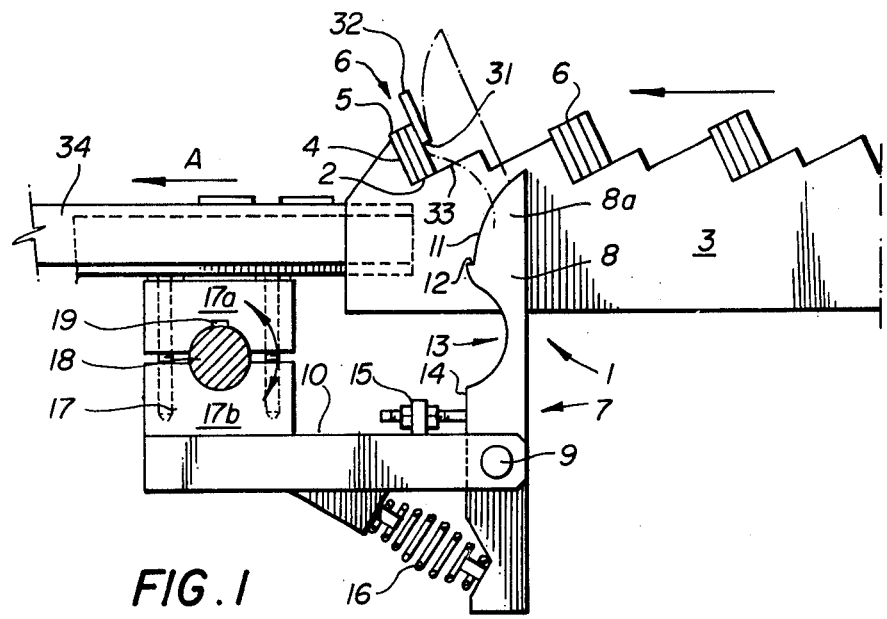
FIG. 1 is a side elevation showing, in solid lines, an unpacking device in a lower rest position and, in dotted lines, a portion of the unpacking device in a partially raised position.
Figure 3:
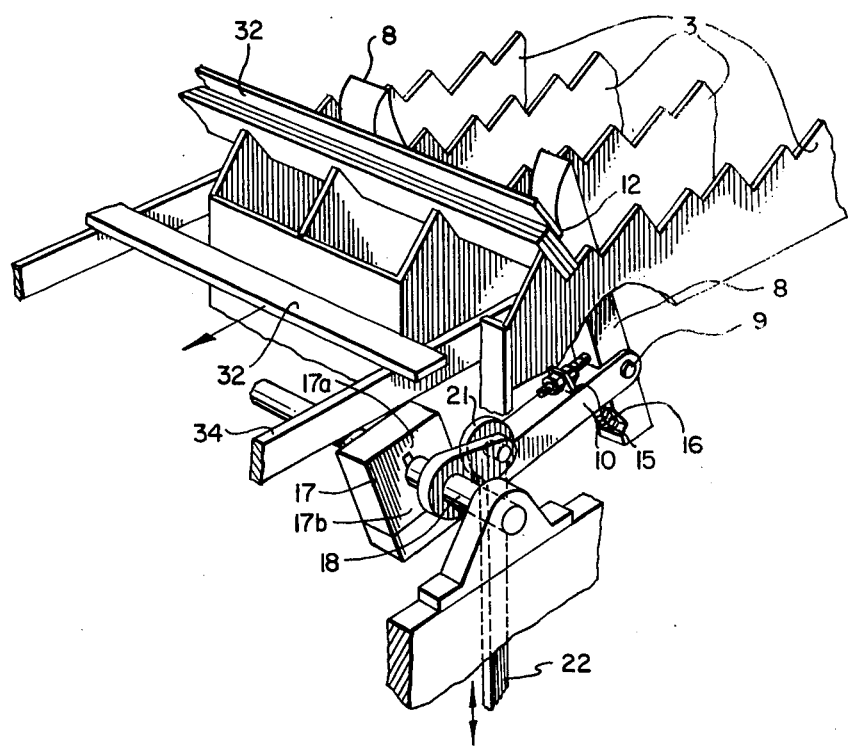
FIG. 3 is a partial perspective view showing one finger of an ejector means in a partially raised position.

Referring to FIG. 1 of the drawings, a separating device, generally referenced 1, includes a generally V-shaped batch receiver means 2 which is formed in a plurality of spaced apart plates 3 arranged in parallel with one another (see FIG. 3). A face 4 of the V-shaped receiver means 2 is inclined towards the forward end of the device, the face 4 being adapted to support a leading bar 5 of a batch of flat bars, generally referenced 6.

The separating device further comprises an element ejector means, designated by the numeral 7, including a plurality of fingers 8 each of which is pivotally mounted at a point towards its lower end by pivot pins 9, to a horizontally extending support beam 10. Each finger 8 is formed at an upper end 8a thereof with an arcuate convex end portion 11 terminating in a horizontal lip portion 12, as seen clearly in FIG. 1. The depth of the lip portion 12 is determined by the thickness of the elongate members to be separated by the device. The thickness of the lip should be less than the thickness of the bars of the batch. On the other hand the lip must be deep enough to engage and support the bar without slippage of the bar therefrom. It has been found, for example, that when the elongate elements are flat metal bars of minimum width 3/16 of an inch, the lip should have a width just less than 3/16 of an inch. The finger 8 has, below the lip 12, an arcuate cut away portion 13 which, as will be described in more detail below, serves to assist the smooth return of the finger 8 from the raised position, after an element has been separated from the batch 6, back to the lower rest position, as shown in solid lines in FIG. 1. Below the cut away portion 13 of the finger 8, is an abutment portion 14 against which abuts an adjusting device 15 to adjust the angle which the finger 8 assumes, in the rest position, to the vertical. Biasing means 16, is provided to bias the abutment portion 14 of the finger 8 against the adjusting device 15. The biasing means may be a counterweight connected to the finger 8. Alternatively a compression spring (as seen in FIG. 1), may be provided between a point on the fingers 8 below the pivot pin 9 and a lower side of the horizontal support beam 10.

The support beam 10 is rigidly mounted to a mounting block 17 which, in turn, is mounted on an oscillatory line shaft 18. The block 17 consists of two components 17a, 17b. The components are secured together and tightly onto the shaft by tightening means, such as bolts, passing through the two components on either side of the shaft 18. The upper block 17a is keyed to the shaft 18 by a key 32. The components 17a, 17b are dimensioned to leave a gap between adjacent faces thereof. The angular position of the lower block 17b on the shaft 18 may be adjusted. In this way, it is possible to adjust the angle of the support beam 10 with respect to the direction of movement of the batch and consequently the path of movement of the fingers 8. The component 17b may be integrally formed with a counterweight to minimise the torque required to drive the shaft 18 and also to inhibit twisting of the shaft.

Figure 2:
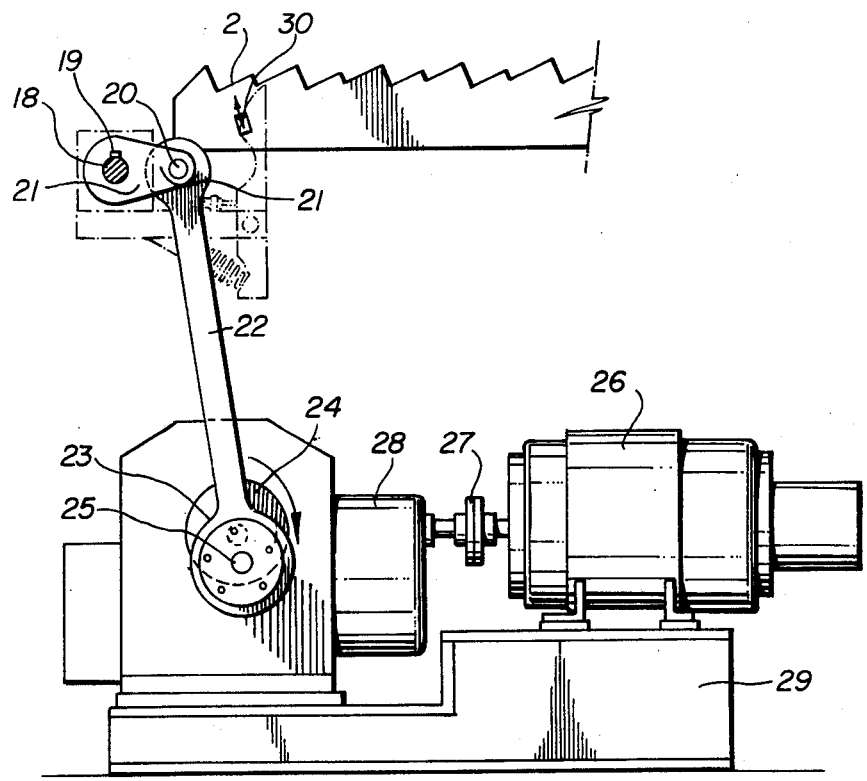
FIG. 2 is a side elevation showing, a drive mechanism.

Referring to FIG. 2, a bell crank 21 is mounted on the shaft 18 by a key 19 and is rotatably connected, at an end thereof distant from the line shaft 18, by a pin 20 to one end of a connecting rod 22. The length of the connecting rod 22 can be varied by a turn-buckle means (not shown) if an adjustment in its length is desired. The other end 23 of connecting rod 22 is eccentrically mounted on a rotatable drive hub 24 by a pin 25. The drive hub 24 is driven by a drive motor 26 via a coupling 27 and a gear box 28. The entire drive assembly, comprising the drive hub 24, coupling 27 and motor 26, is mounted on a supporting base member 29. It is advantageous to locate the motor and drive at the midpoint or the separating device to reduce twisting of the shaft 18. Rotation of the drive hub 24 in a counter-clockwise direction, as seen in FIG. 2, causes the connecting rod 22 to oscillate in a substantially vertical direction which, in turn, causes oscillation of the mounting block 17 and the line shaft 18.

Referring again, to FIG. 2, a sensor 30, for example a grounding sensor or a heat sensor, is provided adjacent the plate 3 below the V-shaped batch receiving means 2. The sensor 30 is sensitive to a local increase in temperature. This occurs when a batch of elements 6, which are still at a temperature substantially above room temperature arrive in the receiving means 2. On the arrival of the batch in the receiving means 2, the sensor activates the motor 26 which, in turn, initiates rotation of drive hub 24 and, consequently, oscillation of line shaft 18. As will be described in more detail below, oscillation of line shaft 18 results in oscillatory movement of the fingers 8 between the lower position, as shown in solid lines in FIG. 1, and a raised position (the finger 8 is shown in a partially raised position in dotted lines in FIG. 1, and also in FIG. 3).

The operation of the device of the present invention will now be described together with a brief indication of the nature of the cooling process which the batches of elongated elements are subjected to prior to their arrival at the receiving means 2. The description which follows will be described for elongate flat metal bars, although it will be appreciated that the device could be equally successfully employed for separating other types of elongate elements such as metal wires and plates. The metal bars are discharged from the rolling mill, divided into predetermined lengths at a shearing point and conveyed along a run-out table adjacent to the cooling bed. A plurality of bars (usually three to six) is collected to form a batch on a skid apron. A kickoff mechanism lifts each bar successively onto the skid apron. Each bar, as it comes to rest on the skid apron, is edged up by a packing device. The kickoff mechanism consists of a line of lift aprons between the rollers of the run-out table and the cooling bed and is motor operated. The aprons are lowered to receive the bar and then raised to allow the bar to slide down onto the first notch of the cooling bed (i.e. the skid apron). The packing device is a series of indexing wedges mounted on rotating shafts beneath the cooling bed. These wedges rise through notches in the skid apron contacting the bar and edging the bar up successively until the designated pack size is formed.

The cooling bed is, again, motor operated and the hot batch is periodically carried over to successive notches by a carry-over bar type mechanism with alternating moving and stationary bars. The notches are V-shaped and have a dual pitch design. In this way, the batches are gradually transferred from the runout table end of the cooling bed to the separation end where the batch has cooled sufficiently to give bars having the desired hardness and flexibility.

The last step in the cooling process is the transfer of the cooled batch of three to six flat metal bars into the receiving means 2. The sensor 30 senses the newly positioned batch and activates the drive mechanism and shuffle bars 34. Rotation of the drive hub 24 effects, via connecting rod 22, oscillatory movement of the mounting block 17 and the line shaft 18. This, in turn, causes the support beam 10 to oscillate from the lower position, as shown in solid lines in FIG. 1, through the partially raised position, as shown in dotted lines in FIG. 1, to the fully raised position. As the support beam 10 moves upwards, the finger 8 is lifted on an arcuate course until the convex curvature portion 11 engages with the lower edge 31 of trailing bar 32. The convex curvature portion 11 of the finger 8 serves to guide the finger 8 until the lip 12 meets the lower edge 31 of the trailing bar 32. Thus, if the overall thickness of the batch 6 in the receiver means 2 is such that the batch extends a significant distance back along the face 33 of the receiving means 2, as the finger 8 approaches the batch 6, on upward radial movement of the support beam 10, the trailing bar 32 is initially engaged by the finger 8 at a point along the convex surface 11. As the finger 8 moves further upwards, it is pivoted about pivot pin 9 against the biasing force of spring 16 until the lip 12 engages with the lower edge 31. Still further upward movement urges the bar 32 to slide upwards against the surface of the adjacent bar and, at a point on this upward movement, the bar 32 tips forwards over the batch onto shuffle bars 34 which urge the thus separated bars 35 to move in a direction indicated by the arrow A in FIG. 1. When the bar 32 is separated from the batch 7, and falls onto the shuffle bars 34, the finger 8 moves forwards such that the arcuate curved portion 13 contacts the top of the next bar of of the batch which is to be separated. At this point, continued rotation of the drive hub causes the mounting block 17 and line shaft 18 to rotate in the reverse direction and thereby to cause the support beam 10 and the finger 8 to return to the lower position as shown in FIG. 1 in solid lines. As the finger 8 returns the cut away arcuate portion moves smoothly over the trailing bar of the batch as the support beam 10 returns to the horizontal position. The cycle is repeated until the batch 6 has been removed completely, bar by bar, from the receiver means 2.

It has been found that superior results can be obtained with an arrangement where the fingers are arranged approximately 10 feet apart. In this way, thin flat bars approximately 3/16 of an inch thick and about 200 feet long can be rapidly and successfully separated, bar by bar, from the batch in the receiver means 2. When the last bar of the batch has been transferred, the sensor deactivates the drive mechanism and the unpacking device is halted until the next batch is received. The process then repeats. The motor 26 is controlled by a rotary limit switch which ensures that the motor is stopped with the finger at the lowermost position.

With reference to FIG. 1, the arc through which the fingers 8 move in an upwards direction to engage with the lower edges 31 of the trailing bar 32 is a function of the distance between the centre of the line shaft 18 and the centre of the pivot pin 9. A further important consideration is the eccentricity of the drive mechanism which gives rise to the angular oscillation of the mounting block 17 and, hence, the fingers 8. If the distance between the centre of the line shaft 18 and the centre of the pivot pin 9 is too large, then the convex arcuate end portion 10 of the finger 8 will not engage with a trailing bar 32 when upward radial movement of the support beam 10 occurs. Conversely, if the distance between the centre of the line shaft 18 and the centre of the pivot pin 9 is too small, then the end portion 10 of the finger 8 will engage with a flat bar in the batch intermediate the leading bar 5 and the trailing bar 32.

It has therefore been found that regular unitary separation of elongate elements from a batch of such elements which has been cooled by progression across a cooling bed, can be achieved sucessfully if the trailing element (having regard to the direction of movement of the batch across the cooling bed), and not the leading element, is separated from the batch.

The devices of the present invention, particularly the arrangement described in detail above, do not display the disadvantages associated with the previous "unpacking" mechanisms. In particular, regular unitary separation of the individual elements from the batch is achieved, irrespective of whether the batch has been regularly packed or not. Furthermore, unlike the leading element of the batch, the trailing element is not deformed by the weight of the other elements in the batch pressing against it. Instead, the trailing element merely rests against the adjacent element of the batch, and, on engagement of the lip 12 of the finger 8 with the lower edge 31 of the trailing element (as seen in FIG. 1), the trailing element is urged in an upwardly forwards direction and slides along the surface of the adjacent element of the batch. Separation is completed by the trailing element falling forwards, over the batch 6, onto the members 34 which, in the manufacture of flat bars, are shuffle bars. The devices of the present invention also have the advantage that they are not excessively expensive to construct and install, which renders them industrially attractive not only from the point of view of cost but also from the point of view of reliability and effectiveness.

The embodiments of the invention in which an exclusive property or privilege is claimed are defined as follows:

1. Apparatus for separating elongate metal bar elements one at a time from a batch of said elements supported on a walking beam bed, said apparatus comprising a batch receiver means having an inclined support face to support the leading element of said batch so that abutting faces of said elements are parallel to said support face, and element ejector means including at least one finger engageable with the trailing element of said batch furthest from said support face to lift said trailing element in an upwardly forward direction to separate said element from said batch and cam surface means on said finger engageable with said trailing element and operable to move said finger progressively away from said support face to permit engagement with successive trailing elements.

2. Apparatus according to claim 1 wherein said batch receiver means is generally V-shaped.

3. Apparatus according to claim 1 wherein said finger includes a lip to engage said trailing element.

4. Apparatus according to claim 3 wherein said cam surface means includes a convex curved surface extending from one end of said finger to said lip.

5. Apparatus according to claim 3 or 4 wherein a concave curved surface is provided on said finger below said lip and merging smoothly therewith.

6. Apparatus according to claim 1 including drive means to cause reciprocal movement of said finger.

7. Apparatus according to claim 6 wherein said drive means includes a beam rigidly mounted at one end to a shaft and said finger is pivotally mounted on the other end of said beam.

8. Apparatus according to claim 7 wherein said drive means further includes a drive mechanism to cause oscillatory movement of said shaft.

9. Apparatus according to claim 7 including biasing means for biasing said fingers against said trailing element.

10. Apparatus according to claim 9 wherein said biasing means is a counterweight attached to said finger.

11. Apparatus according to claim 9 or 10 including abutment means to limit movement of said finger by said biasing means.

12. Apparatus according to claim 9 or 10 including adjustable abutment means to limit movement of said finger by said biasing means.

13. Apparatus for separating elongate metal bar elements one at a time from a batch of said elements supported on a walking beam bed, said apparatus comprising a batch receiver means having an inclined support face to support the leading element of said batch and element ejector means including a plurality of fingers each pivotally supported at one end of a respective beam, said beams being connected to a shaft, drive means for oscillating said shaft to cause reciprocal movement of said fingers, said fingers including at one end cam surface means engageable with said trailing element and operable to move said finger progressively away from said support face to permit engagement with successive trailing elements, said cam surface means comprising a curved convex surface terminating in a lip, said finger further including a curved concave surface of the opposite side of said lip to said convex surface and biasing means biasing said fingers toward said trailing element, said biasing means causing said convex portion to engage said trailing element upon movement of said boom toward said elements and thereby pivot said fingers relative to said boom to align said lip with said trailing element.

14. Apparatus according to claim 13 wherein said biasing means causes said concave surface to engage said trailing element and thereby permit movement of said lip past said trailing element upon movement of said boom away from said elements.

15. A method of separating elements one at a time from a batch of said elements comprising the steps of depositing the batch in a batch receiver means, supporting the leading element against an inclined support face and lifting the trailing element in an upwardly forward direction to separate the trailing element from the batch.

* * * * *